(12) United States Patent
Mutt

(10) Patent No.: US 8,453,224 B2
(45) Date of Patent: May 28, 2013

(54) SINGLE SIGN-ON AUTHENTICATION

(75) Inventor: Girish Bitmandi Mutt, Bangalore (IN)

(73) Assignee: Novell, Inc., Provo, UT (US)

( * ) Notice: Subject to any disclaimer, the term of this patent is extended or adjusted under 35 U.S.C. 154(b) by 367 days.

(21) Appl. No.: 12/604,952

(22) Filed: Oct. 23, 2009

(65) Prior Publication Data

US 2011/0099618 A1 Apr. 28, 2011

(51) Int. Cl.
*G06F 7/04* (2006.01)
*G06F 12/14* (2006.01)
*H04L 29/06* (2006.01)
*H04L 9/32* (2006.01)
*G06F 21/00* (2006.01)
*G06F 15/16* (2006.01)
*G06F 15/173* (2006.01)

(52) U.S. Cl.
USPC .............. 726/8; 726/22; 713/161; 713/168; 713/170; 713/182; 709/217; 709/224

(58) Field of Classification Search
USPC . 726/8, 22; 713/161, 168, 170, 182; 709/217, 709/224
See application file for complete search history.

(56) References Cited

U.S. PATENT DOCUMENTS

| | | | |
|---|---|---|---|
| 6,854,056 B1 | 2/2005 | Benantar et al. | |
| 2006/0200425 A1* | 9/2006 | Steele et al. | 705/64 |
| 2008/0059804 A1 | 3/2008 | Shah et al. | |
| 2009/0165104 A1 | 6/2009 | Danielsen et al. | |
| 2011/0072262 A1* | 3/2011 | Amir et al. | 713/168 |

* cited by examiner

*Primary Examiner* — Aravind Moorthy
(74) *Attorney, Agent, or Firm* — Schwegman, Lundberg & Woessner, P.A.

(57) ABSTRACT

Apparatus, systems, and methods may operate to receive a request from a node to provide access to a web site, to provide site authenticity information associated with the web site to the node, and to receive single sign-on (SSO) information from the node in response to validation of the site authenticity information by the node, the SSO information enabling the node to automatically log in to the web site. Additional activities include receiving site authenticity information from a node associated with a web site, and automatically transmitting SSO information to the node responsive to validating the site authenticity information. Additional apparatus, systems, and methods are disclosed.

19 Claims, 4 Drawing Sheets

SINGLE SIGN-ON AUTHENTICATION

BACKGROUND

In existing single sign-on (SSO) applications, which are intended to provide a more convenient user experience, users may be automatically logged into a selected web site without checking the authenticity of the site. Thus, when a user attempts to access personal finance and similar sites where confidentiality is important, user credentials in the form of username and password might inadvertently be tendered by an SSO application to a false site masquerading as the real site. This can happen, for example, when an SSO application operates to log into a site based on the domain or uniform resource locator (URL) address of the site, and the user credentials are captured by a false site that substitutes its own address for the real one. This result can lead to decreased consumer satisfaction, as well as decreased network security.

SUMMARY

In various embodiments, apparatus, systems, and methods that support SSO authentication are provided. For example, in some embodiments, SSO authentication is implemented by receiving a request from a node to provide access to a web site, providing site authenticity information associated with the web site to the node, and receiving SSO information from the node in response to validation of the site authenticity information by the node, the SSO information enabling the node to automatically log in to the web site.

In some embodiments, SSO authentication is implemented by receiving site authenticity information from a node associated with a web site, and automatically transmitting SSO information to the node responsive to validating the site authenticity information, the SSO information enabling automatic log-in to the web site. Additional embodiments are described, and along with the foregoing examples, will be set forth in detail below.

DETAILED DESCRIPTION

Figure 1:
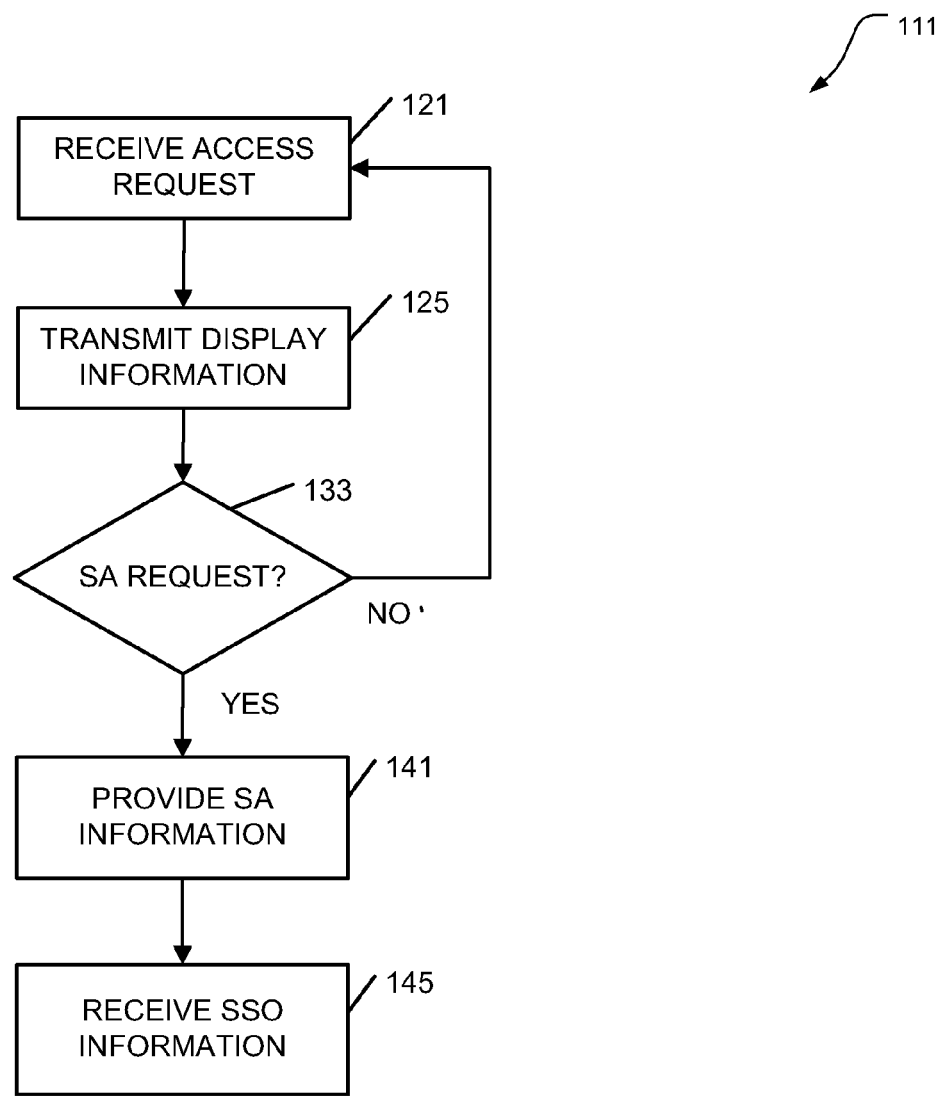
FIG. 1 is a flow diagram illustrating methods of SSO authentication according to various embodiments of the invention.

In various embodiments, SSO operations can be implemented using a record-replay mechanism. Recording is used to capture and store site authenticity information, which may be augmented by URL/domain information for the site, and other information elements that characterize the site. During subsequent login attempts, the web site is authenticated by comparing current information gained from the site with the site authenticity information that has been previously stored. If the information matches, this indicates to the accessing node that the site being accessed is authentic. Once the site is found to be authentic, the replay operation can be used to submit the username and password to the site, so that SSO login is accomplished.

Site authenticity information can be obtained by abstracting information provided in the security certificate associated with a site, such as a Secure Socket Layer protocol certificate (SSL certificate) that has been issued to the site by a Certificate Authority. It should be noted that while the use of an SSL certificate is described herein as part of several example embodiments herein, the various embodiments are not to be so limited. Other types of certificates and information that can serve to indicate the authenticity of a site can be used.

For example, the site authenticity information for various embodiments may comprise any one or more SSL certificate parameters taken from the Issuer and/or Subject fields of an SSL certificate. Validity dates/times can also be abstracted from an SSL certificate to compare with the date on which access is attempted to confirm that the certificate has not expired. Certificate expiration can be used as the basis of a user alert/alarm, or recorded as an event, as described below. The operation of an example embodiment will now be described.

To begin, a browser application may be launched on a client, and directed to a known URL to display the site to the user. The site may then be displayed, along with an SSL certificate icon as part of the browser status bar.

At this point, the server for the site might automatically provide the site authenticity information to the client, or the client might operate to extract information from the certificate using the browser application, or a background application that operates in conjunction with the browser application. Recording of site authenticity information may be triggered via detecting the presence of username and/or password login fields as part of the web site, which indicate that SSO operations may be enabled for that site.

All of the individual information components that make up an SSL certificate are well known to those of ordinary skill in the art, and any one or more of these components may be used to form the site authenticity information that is used in various embodiments. Such information components may include the organization unit (OU), organization (O), and country (C) as part of the Issuer information. Similarly, such components may include the common name (CN), organization unit (OU), organization (O), location (L), state (S), and country (C) as part of the Subject information. Other components may be used as well.

An application resident on the client, or elsewhere in the network, may thus operate to capture any number of selected components and store them. These recorded components can be used for confirming site authenticity when future access attempts are made, prior to performing SSO operations. Thus, it can be seen that site authenticity can be confirmed without any knowledge of the user login credentials, such as the username and password.

In some embodiments, the user may be prompted to enable authenticated SSO operations when a web site is first accessed, adding an extra level of security, since the user will then be aware that site authenticity information is about to be recorded for the particular site being accessed at that moment. This type of prompting may urge the user to thoroughly investigate the site to ensure that it is indeed an authentic one, prior to enabling future SSO access for the site.

Once site authenticity information is recorded, authentication can occur whenever the web site is accessed at a later time. This can be accomplished by attempting to match the stored site authenticity information to site authenticity information extracted during a subsequent access attempt.

If the stored site authenticity information matches the site authenticity information obtained during a subsequent access attempt, then the replay mechanism can be activated, to play back the SSO information to the site. Otherwise, if no match occurs, the user may be notified and/or the user credentials (e.g., username and password) may be locked.

Finally, the events of accessing the site, matching the site authenticity information (or failing to match the information), and playback of the SSO information can all be tracked and recorded. Recording may occur, for example, as part of an enterprise-wide compliance monitoring program.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of SSO authentication according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, SSO authentication is now discussed with reference to FIG. 1.

In some embodiments, a processor-implemented method 111 that can be executed on one or more processors that perform the method may operate to authenticate SSO operations, as viewed from the perspective of a web site server, for example, by transmitting site authenticity information to a node attempting to access the site, and receiving SSO information from the node in response, after the authenticity information sent from the site server is validated by the node. Thus, the method 111 may begin at block 121 with receiving a request from a node to provide access to a web site.

Display information, including information for displaying an image of a security certificate or some other visible indication of security, may be transmitted to indicate the availability of site authenticity information at the web site. Thus, the method 111 may continue on to block 125 with transmitting information to display the web site, along with an image of an SSL certificate associated with site authenticity information. It should be noted that site authenticity information is different from site authentication information, the latter including user log-in credentials, such as a combination of user name and password, that are used to authenticate the user's identity before permitting the user to access a web site.

If username and/or password fields are displayed at the web site, then SSO access may be available. Thus, the method 111 may include, at block 125, transmitting display information associated with at least a username log-in field or a password log-in field to indicate that SSO access to the web site is available.

The accessing node may then operate to explicitly transmit a request to obtain the site authenticity information in some embodiments. Thus, the method 111 may include determining, at block 133, whether a request has been made for the site authenticity information. The method 111 may further include receiving a request for the site authenticity information from the accessing node, and continue on to block 141. Otherwise, in some embodiments, if no request is received, the method 111 may continue back to block 121.

In some embodiments, the site authenticity information will be provided (for extraction, or explicitly sent) to the accessing node without any specific request for the information being presented. Thus, the method 111 may include, at block 141, providing site authenticity information associated with the web site to the node.

The site authenticity information may include more than security certificate information, such as web site content (e.g., a domain name) extracted from the web site itself. Thus, the activity at block 141 may comprise providing the site authenticity information comprising a combination of information included in web site content associated with the web site, and information included in a security certificate associated with the web site.

Security certificate information may comprise time information (e.g., valid from and valid to dates that together define a validity period), organization information (e.g., an organization name or unit, perhaps extracted from the Issuer field of an SSL certificate), or location information (e.g., state or country, perhaps extracted from the Subject field of the SSL certificate), among others. Thus, the information included in the security certificate may comprise any one or more of time information, organization information, or location information.

The method 111 may continue on to block 145 to include receiving SSO information from the node in response to validation of the site authenticity information by the node, the SSO information enabling the node to automatically log in to the web site. Other embodiments may be realized.

Figure 2:
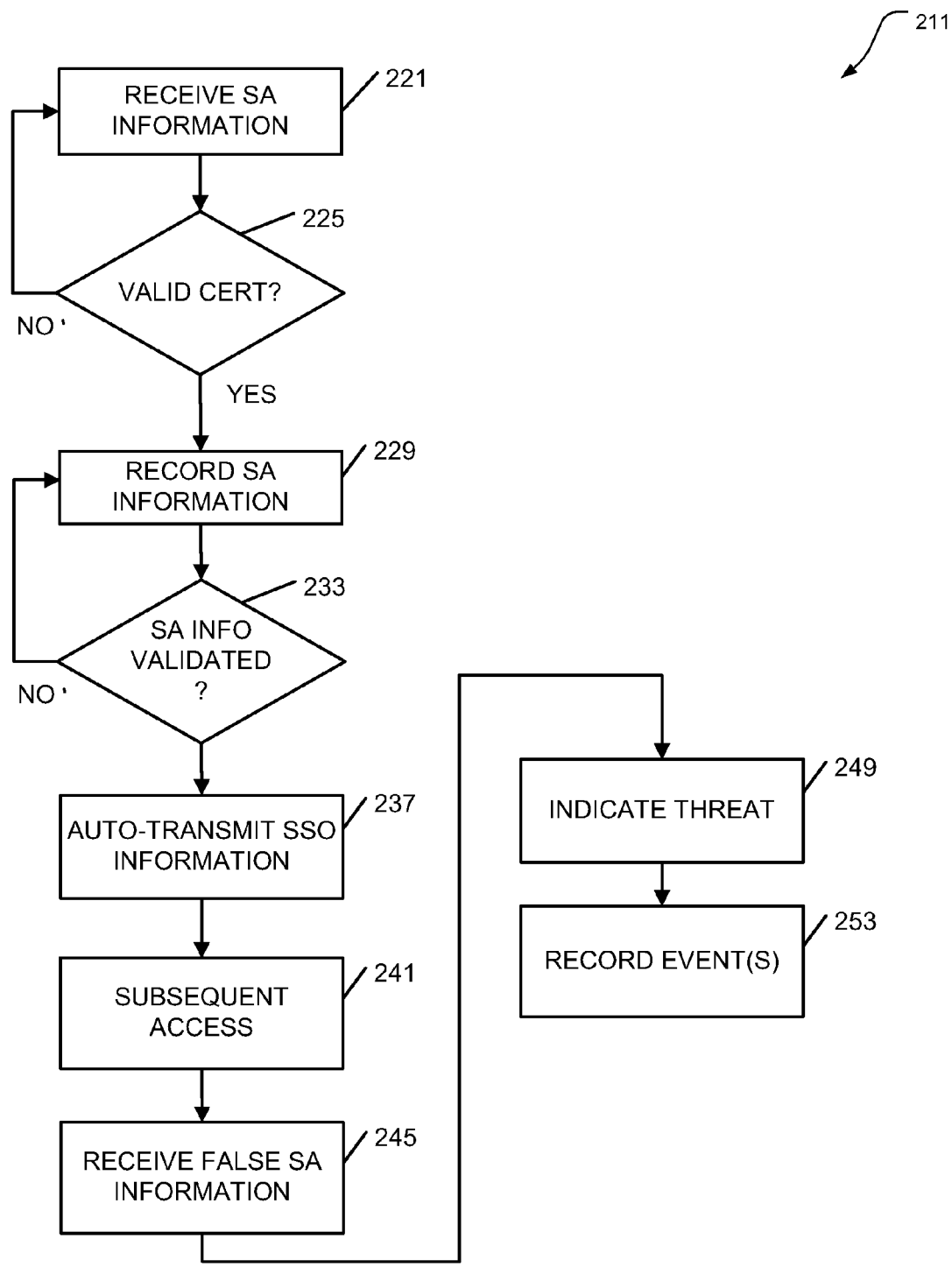
FIG. 2 is a flow diagram illustrating additional methods of SSO authentication according to various embodiments of the invention.

For example, FIG. 2 is a flow diagram illustrating additional methods 211 of SSO authentication according to various embodiments of the invention. In this case, the methods 211 may be viewed from the perspective, for example, of a node accessing the web site server, such that once site authenticity information has been received and validated, SSO information can be sent to the site. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may begin at block 221 with receiving site authenticity information from a node associated with a web site. The site authenticity information can be obtained in many ways, such as by using a browser in the foreground, or by using an application executing in the background. Thus, the activity at block 221 may include receiving the site authenticity information by executing a background application that bypasses browser application activity, wherein the browser is used to display the web site, for example.

At this time, the method 211 may go on to include determining whether the web site has a valid security certificate at block 225. If not, then the method 211 may operate to return to block 221 in some embodiments. If so, then the method 211 may continue on to block 229.

If an attempt is made to access a web site for the first time, and the security certificate for the web site is invalid, the site authenticity information may not be recorded in some embodiments. Thus, the activity at block 225 may include refraining from recording the site authenticity information if the site authenticity information comprises an invalid security certificate.

At block 229, the method 211 may comprise recording the site authenticity information to enable SSO access to the web site during subsequent access attempts. This usually occurs when accessing the web site for the first time, but can occur at other times as well. The site authenticity information may be stored in a directory service (DS), in conjunction with the SSO information, perhaps as part of enterprise SSO application operations.

In some embodiments, the site authenticity information can be validated using security certificate information. Thus, the method 211 may include, at block 233, validating the site authenticity information by matching previously-stored security certificate information with some of the site authenticity information that is obtained during the current access session. In some embodiments, if the site authenticity information is not validated, further recording of authenticity information may occur at block 229 (e.g., the site security certificate has expired, but other site authenticity information is still valid, and can be recorded for future use).

The method 211 may continue on to block 237 with automatically transmitting SSO information to the node responsive to validating the site authenticity information, the SSO information enabling automatic log-in to the web site.

The method 211 may continue on to blocks 241, 245, and 249 to include subsequently attempting to access the web site, receiving false site authenticity information that does not match a stored version of the site authenticity information, and indicating a potential threat posed by a potentially false version of the web site based on the false site authenticity information, respectively. Thus, the user may be alerted/alarmed as to the existence of invalid site authenticity information. If enough details are provided in the alert, the user at that point may decide whether the problem is serious (e.g., no site authenticity matches), or not (e.g., the site security certificate has expired, but all other information matches), depending on the particular application.

Any number of events that occur as part of the SSO access process can be recorded, perhaps as part of enterprise compliance procedures. Thus, the method 211 may include, at block 253, recording one or more events. The events may be associated with any number of circumstances, such as transmitting SSO information, capturing site authenticity information, failing to match potentially false site authenticity information with a stored version of the site authenticity information, recording new site information as potentially false site authenticity information, and/or preventing transmission of the SSO information in response to detecting the presence of potentially false site authenticity information.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of SSO authentication shown in FIGS. 1 and 2 can be implemented in various devices, as well as in a computer-readable storage medium, where the methods are adapted to be executed by one or more processors. Further details of such embodiments will now be described.

Figure 3:
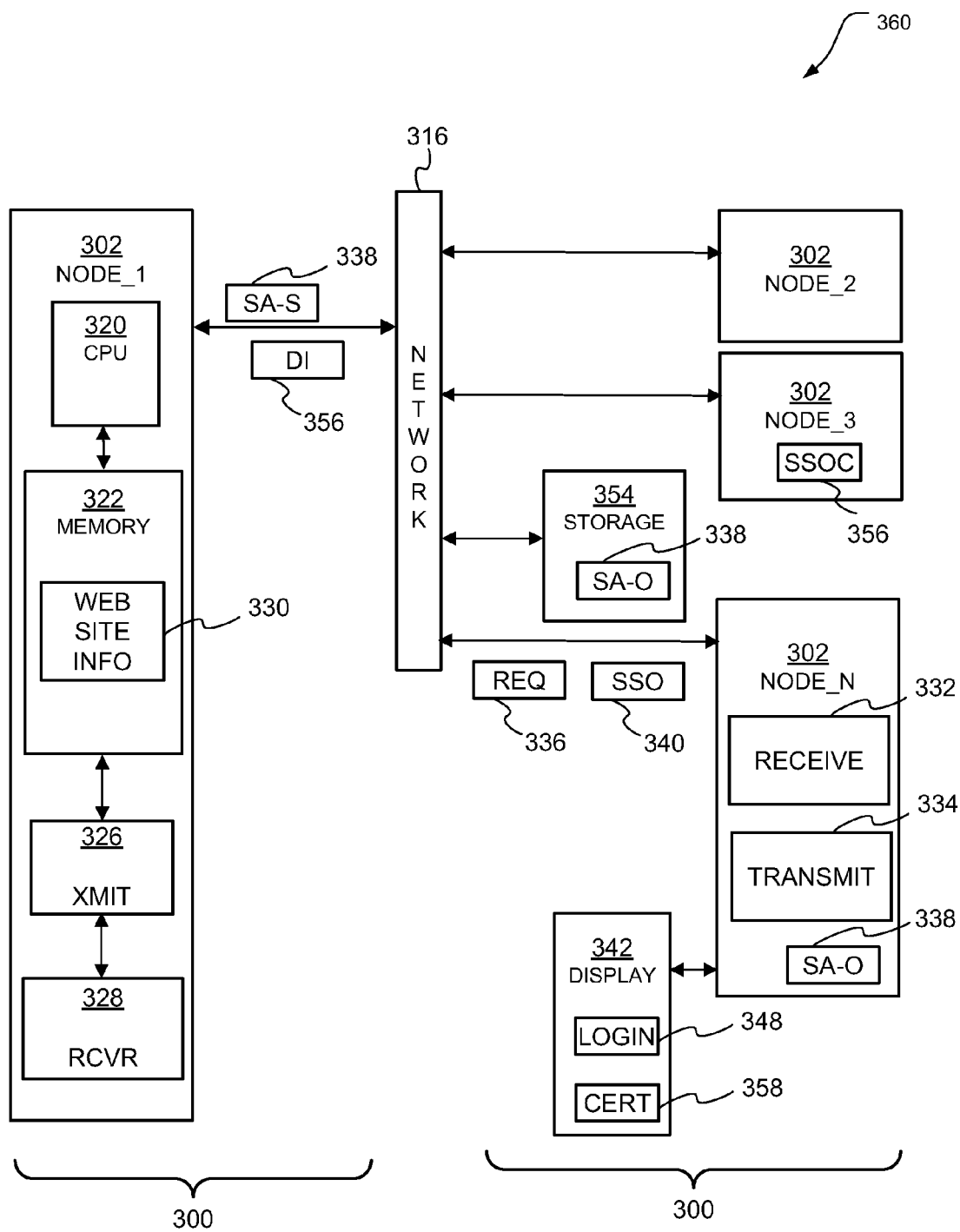
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement SSO authentication may comprise one or more processing nodes 302, one or more processors 320, memory 322, a transmission module 326, and a reception module 328. In some embodiments, the apparatus 300 may comprise a processing node 302 that includes a reception module 332, a transmission module 334, and a display 342. The apparatus 300 may comprise a server, a client, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302.

In some embodiments then, an apparatus 300 may comprise a node (e.g., NODE_N) that operates to receive and validate site authenticity information before transmitting SSO information to gain access to a web site. In this case, the apparatus 300 comprise a reception module 332 in a second node (e.g., NODE_N) to receive site authenticity information 338 from a first node (e.g., NODE_1) associated with a web site. The apparatus 300 may further comprise a transmission module 334 to transmit SSO information 340 to the first node responsive to validating the site authenticity information 338, the SSO information 340 enabling automatic log-in to the web site by the second node.

The site authenticity information 338 can be stored as original site authenticity information SA-O, perhaps in a storage node 354 providing a directory service. Thus, the apparatus 300 may further comprise a third node 354 to store the site authenticity information SA-O.

The second node (e.g., NODE_N) can operate to lock up the use of SSO information 340 to protect the user against submitting the information to a false web site, helping to secure the use of the SSO information 340. Thus, the apparatus 300 may be designed to operate so as to prevent transmission of the SSO information 340 upon detecting a potentially false version of the web site, for example. Still further embodiments may be realized.

For example, it can be seen that a system 360 that operates to implement SSO authentication may comprise multiple instances of the apparatus 300. The system 360 might also comprise a cluster of nodes 302, including physical and virtual nodes. It should be noted that any one of the nodes 302 may include any one or more of the elements explicitly shown in any other one of the nodes NODE_1, NODE_2, . . . NODE_N.

In some embodiments then, a system 360 can operate using one or more nodes 302. That is, a system may comprise a reception module 328 in a first node (e.g., NODE_1) to receive a request 336 from a second node (e.g., NODE_N) to provide access to a web site. The system 360 may further include a transmission module 326 to provide site authenticity information 338 associated with the web site to the second node, wherein the reception module 328 is to receive SSO information 340 from the second node in response to validation of the site authenticity information 338 (e.g., as subsequently-obtained site authenticity information SA-S) by the second node, the SSO information enabling the second node to automatically log in to the web site.

The web site may operate to enable display of username and/or password log-in fields to indicate the availability of SSO access, as well as an SSL certificate to indicate the availability of SSL information that can be used as part of the site authenticity information. Thus, in some embodiments, the transmission module 326 is to transmit display information 356 comprising a username log-in field and/or a password log-in field, and SSL certificate availability.

A system 360 may comprise the web site server, an end user node to access the server, and an SSO client acting as an intermediary between the server and the end user node. Thus, in some embodiments, a system 360 may comprise an SSO client operating as an intermediary node (e.g., NODE_3)

between the first node (e.g., NODE_1) and the second node (e.g., NODE_N), the SSO client operating to capture the site authenticity information SA-O for storage and recall, wherein the recall of the site authenticity information SA-O is used during subsequent SSO sessions to validate authenticity of a subsequently-accessed web site purporting to be the web site (by determining whether subsequently-obtained site authenticity information SA-S matches the previously-stored site authenticity information SA-O). The intermediary node may be used to store SSO credentials 356 for any number of users, associating them with the stored site authenticity information SA-O in some embodiments.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including web site information 330, login display information 348, and/or security certificate information 358.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
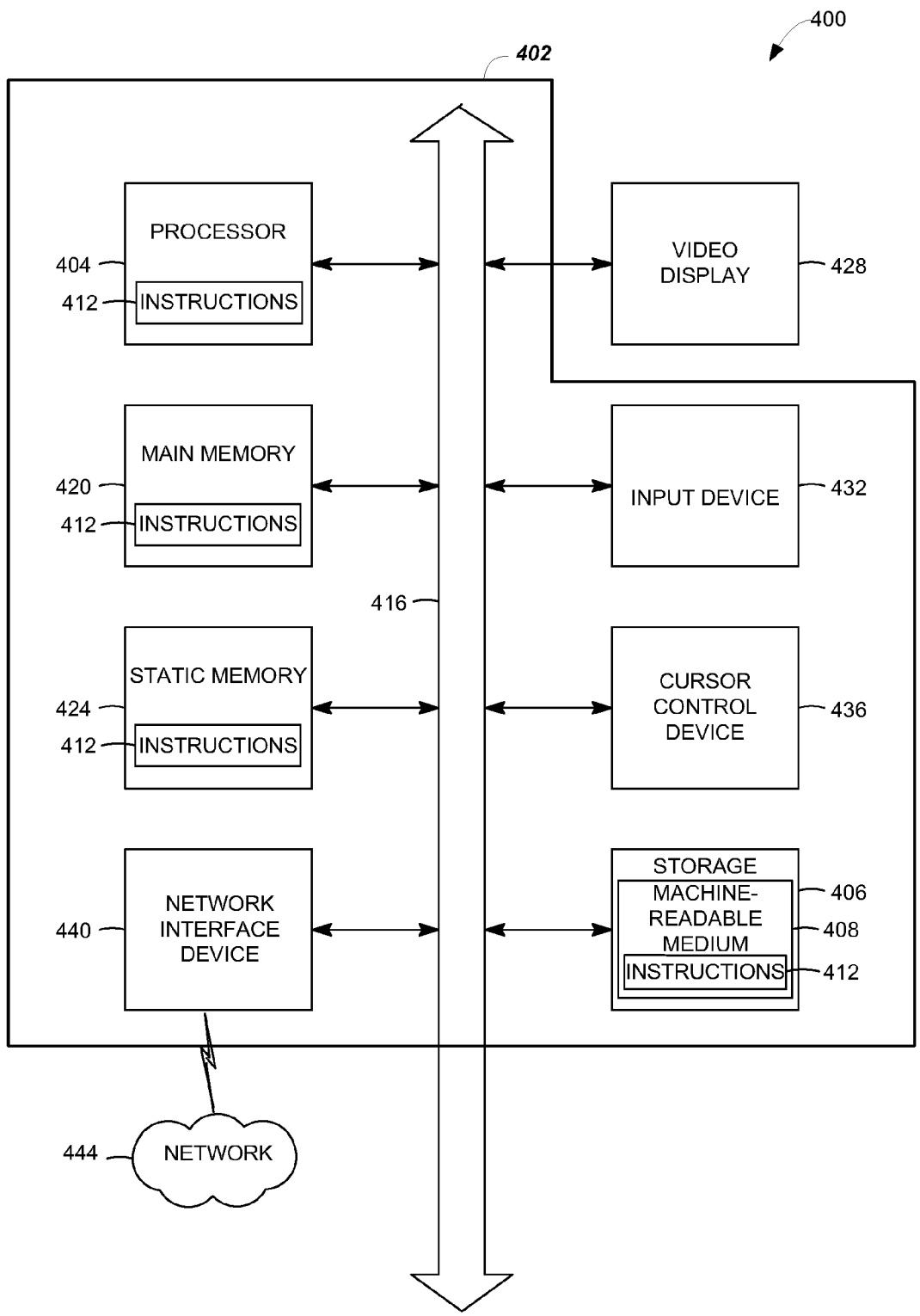
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to significantly reduce the risk of inadvertently releasing SSO user credentials to false sites by authenticating web sites prior to commencement of SSO operations. Increased network security, as well as user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   a reception module in a first node comprising a physical machine, the reception module to receive a request from a second node to provide access to a web site; and
   a transmission module to provide site authenticity information associated with the web site to the second node, wherein the reception module is to receive single sign-on information from the second node in response to validation of the site authenticity information by the second node, the single sign-on information enabling the second node to automatically log in to the web site, wherein at least one of the transmission module or the reception module is configured to record an event associated with at least one of transmitting of the single sign-on information, capturing the site authenticity information, failing to match potentially false site authenticity information with a stored version of the site authenticity information, recording new site information as the potentially false site authenticity information, or preventing transmission of the single sign-on information in response to detecting the potentially false site authenticity information.

2. The system of claim 1, wherein the transmission module is to transmit display information comprising a username log-in field and/or a password log-in field, and secure sockets layer security certificate availability.

3. The system of claim 1, further comprising:
   a single sign-on client operating as an intermediary node between the first node and the second node, the single sign-on client to capture the site authenticity information for storage and recall, wherein the recall of the site authenticity information is used during subsequent single sign-on sessions to validate authenticity of a subsequently-accessed web site purporting to be the web site.

4. An apparatus, comprising:
   a reception module in a second node comprising a physical machine, the reception module to receive site authenticity information from a first node associated with a web site; and
   a transmission module to transmit single sign-on information to the first node responsive to validating the site authenticity information, the single sign-on information enabling automatic log-in to the web site by the second node, wherein at least one of the transmission module or the reception module is configured to record an event associated with at least one of transmitting of the single sign-on information, capturing the site authenticity information, failing to match potentially false site authenticity information with a stored version of the site authenticity information, recording new site information as the potentially false site authenticity information, or preventing transmission of the single sign-on information in response to detecting the potentially false site authenticity information.

5. The apparatus of claim 4, further comprising:
   a third node to store the site authenticity information.

6. The apparatus of claim 4, wherein the second node is to prevent transmission of the single sign-on information upon detecting a potentially false version of the web site.

7. A processor-implemented method to execute on one or more processors that perform the method, comprising:
   receiving a request from a node to provide access to a web site;
   providing site authenticity information associated with the web site to the node;
   receiving single sign-on information from the node in response to validation of the site authenticity information by the node, the single sign-on information enabling the node to automatically log in to the web site; and
   recording an event associated with at least one of transmitting of the single sign-on information, capturing the site authenticity information, failing to match potentially false site authenticity information with a stored version of the site authenticity information, recording new site information as the potentially false site authenticity information, or preventing transmission of the single sign-on information in response to detecting the potentially false site authenticity information.

8. The method of claim 7, wherein the providing further comprises:
   providing the site authenticity information comprising a combination of information included in web site content associated with the web site, and information included in a security certificate associated with the web site.

9. The method of claim 8, wherein the information included in the security certificate comprises at least one of: time information, organization information, or location information.

10. The method of claim 7, further comprising:
    receiving a request for the site authenticity information from the node.

11. The method of claim 7, further comprising:
    transmitting information to display the web site, along with an image of a secure sockets layer security certificate associated with the site authenticity information.

12. The method of claim 7, further comprising:
    transmitting display information associated with at least a username log-in field or a password log-in field to indicate that single sign-on access to the web site is available.

13. A processor-implemented method to execute on one or more processors that perform the method, comprising:

receiving site authenticity information from a node associated with a web site; and automatically transmitting single sign-on information to the node responsive to validating the site authenticity information, the single sign-on information enabling automatic log-in to the web site; and recording an event associated with at least one of transmitting of the single sign-on information, capturing the site authenticity information, failing to match potentially false site authenticity information with a stored version of the site authenticity information, recording new site information as the potentially false site authenticity information, or preventing transmission of the single sign-on information in response to detecting the potentially false site authenticity information.

14. The method of claim 13, further comprising:

recording the site authenticity information to enable single sign-on access to the web site during subsequent access attempts.

15. The method of claim 14, further comprising:

refraining from the recording if the site authenticity information comprises an invalid security certificate.

16. The method of claim 13, wherein the receiving further comprises:

receiving the site authenticity information by executing a background application that bypasses browser application activity, wherein the browser is used to display the web site.

17. The method of claim 13, wherein the validating further comprises:

validating the site authenticity information by matching previously-stored security certificate information with some of the site authenticity information.

18. The method of claim 13, wherein the site authenticity information is stored in a directory service in conjunction with the single sign-on information.

19. The method of claim 13, further comprising:

subsequently attempting to access the web site;

receiving false site authenticity information that does not match a stored version of the site authenticity information; and indicating a potential threat posed by a potentially false version of the web site based on the false site authenticity information.

\* \* \* \* \*